UNITED STATES PATENT OFFICE.

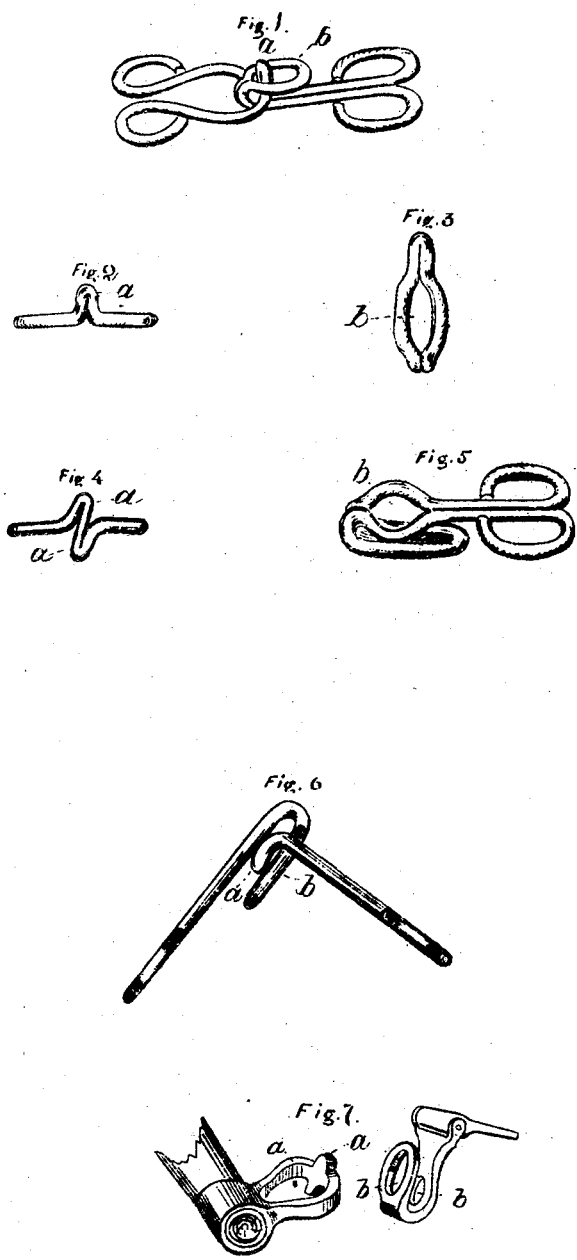

JOSEPH CHARLES HOWELLS, OF NEW YORK, N. Y.

IMPROVEMENT IN HOOKS AND EYES.

Specification forming part of Letters Patent No. 45,411, dated December 13, 1864.

*To all whom it may concern:*

Be it known that I, JOSEPH CHARLES HOWELLS, of the city, county, and State of New York, have invented a new and improved mode in the construction of hooks and eyes for wearing-apparel and other uses; and I do hereby declare that the following is a full and exact description thereof, reference being had to the accompanying drawings, and to the letters of reference marked thereon. Similar letters of reference indicate like parts in all the drawings.

Figure 1 is a perspective view of my improved hook and eye as they appear when properly attached. Fig. 2 is an end view of the eye. Figs. 3, 4, and 5 are modifications in the form of the hook and eye. Fig. 6 is a sectional view of my improved hook and eye, showing the angle they must sustain to each other before they can be hooked together properly. Fig. 7 is a perspective view of my improved hook and eye as applied to harness and used for purposes of draft.

The nature of my invention consists in so constructing the hook and eye that they cannot be correctly attached to or detached from each other without sustaining a particular angle, as will be more fully described.

I construct my improved hook and eye out of any suitable material, imparting to the hook and eye, by hand-labor or by machinery, substantially the forms as seen in the drawings, Figs. 1, 2, and 6, when they are to be used for wearing-apparel; when used for harness and purposes of draft, substantially the form as seen in the drawing Fig. 7. Figs. 3, 4, and 5 are at times desirable as modifications in the form of the hook and eye.

It is obvious from the peculiar construction of the eye at *a*, as seen in all the figures, that the hook cannot be properly attached to or detached from the eye without sustaining a particular angle. The advantage to be derived from hooks and eyes thus constructed is, their non-liability to become detached when once properly hooked together. The angle at which they shall attach can be regulated by the pitch or angle at which the point, spur, or projection *a* on the eye is set. The opening *b* in the bill of the hook should be quite as long as the projection *a* on the eye; but when the opening is in the back of the hook that is not necessary. Where there is an opening in the back and bill of the hook to receive the double projection on the eye, as in Figs. 4 and 7, it should be substantially in the proportion as seen at *b b*, Fig. 7. No particular advantage is secured by the double projection on the eye, nor the double opening in the hook, they being only regarded as modifications in their construction, the principle remaining unchanged.

What I claim, and desire to secure by Letters Patent, is—

The construction of hooks and eyes for wearing-apparel and other uses substantially as shown and described.

JOSEPH CHARLES HOWELLS.

In presence of—
R. D. O. SMITH,
JAS. A. ASHLEY.